Nov. 21, 1967    H. W. DIETERT ET AL    3,353,407
GRANULAR MATERIAL TESTING APPARATUS
Filed Aug. 24, 1964    4 Sheets-Sheet 1

INVENTORS
HARRY W. DIETERT
RALPH E. STEINMUELLER
BY
ATTORNEYS

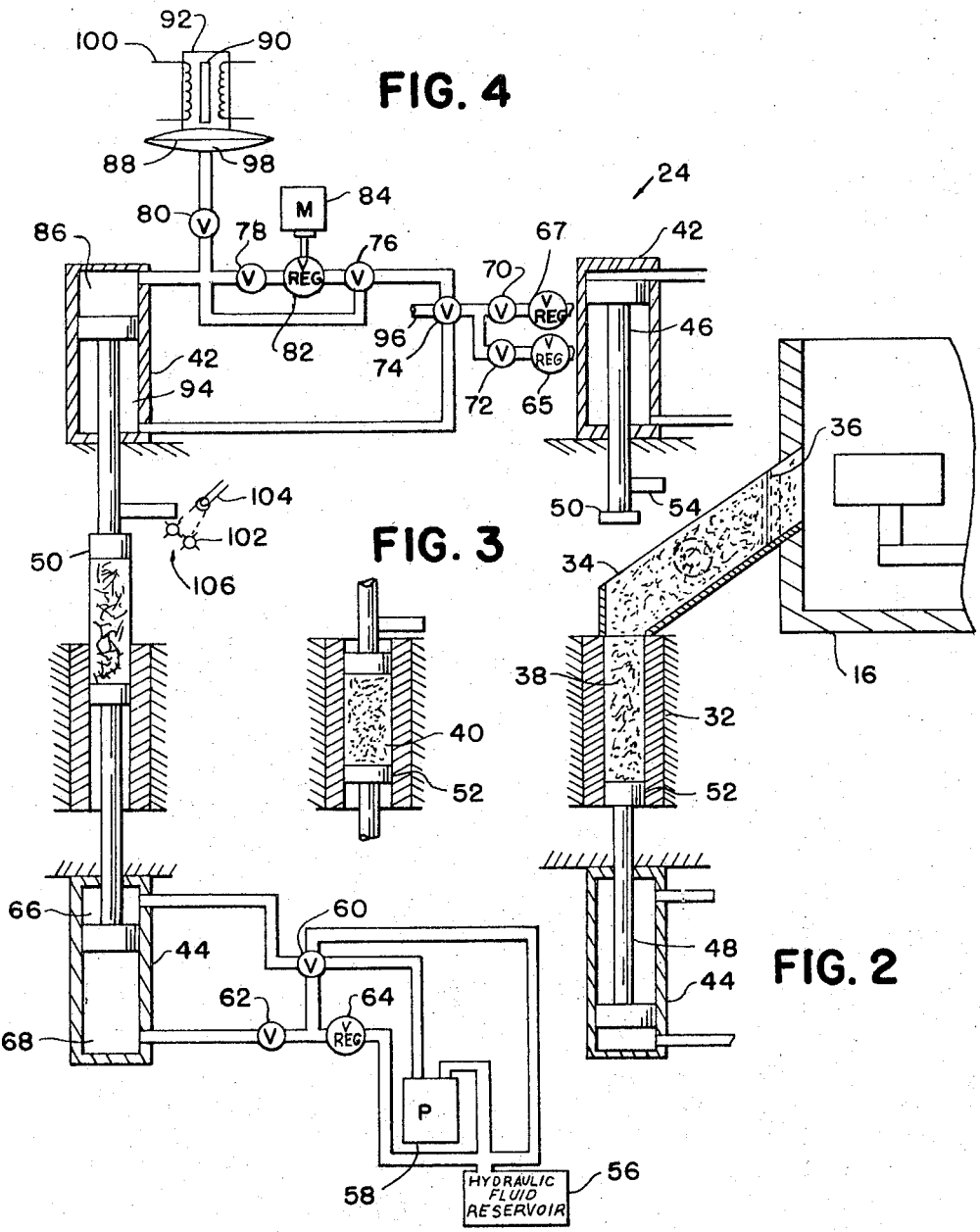

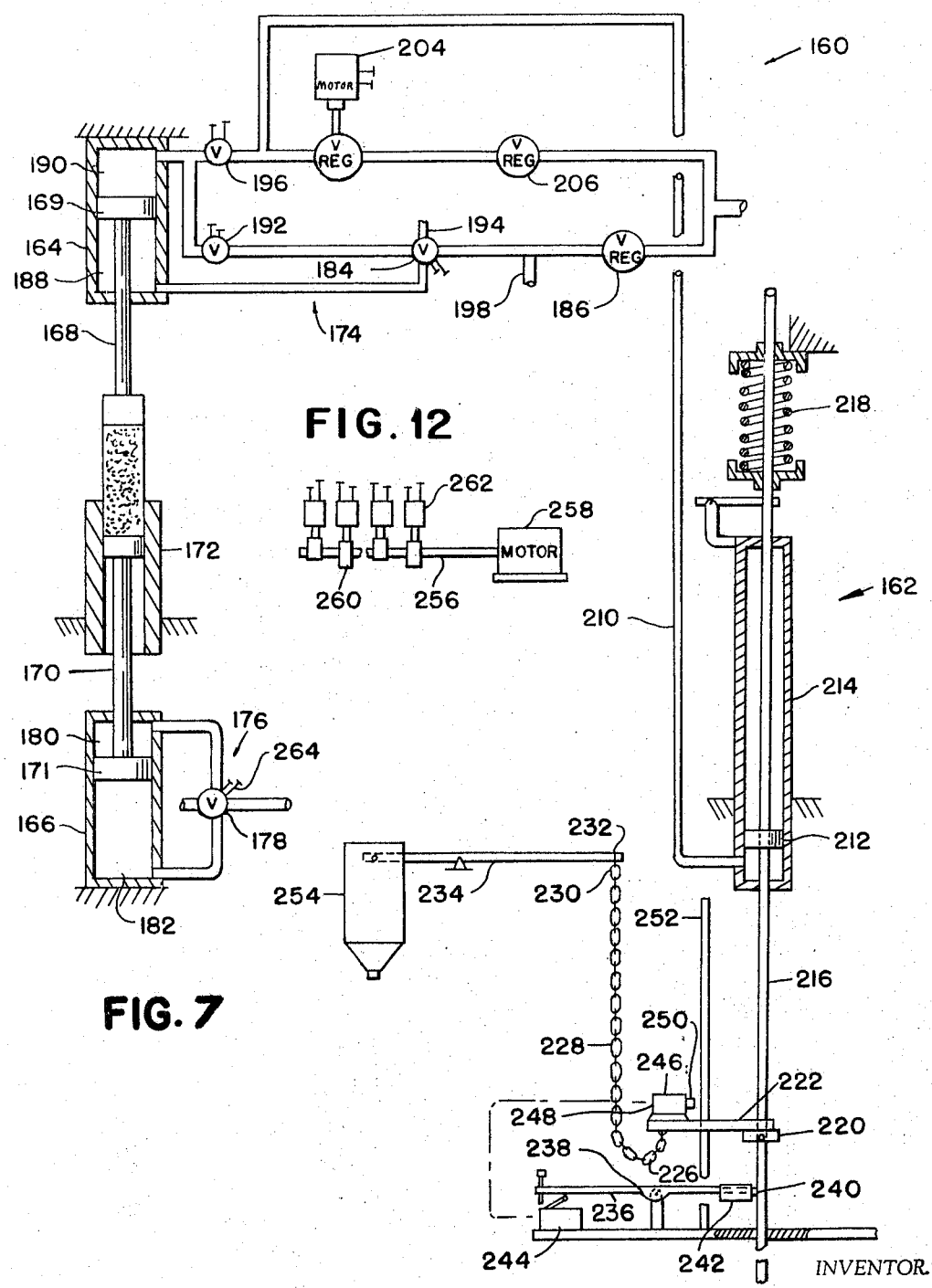

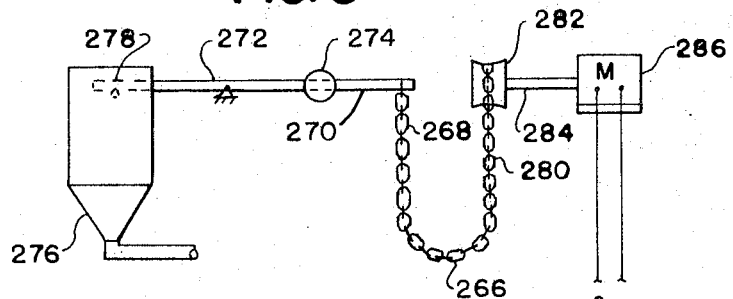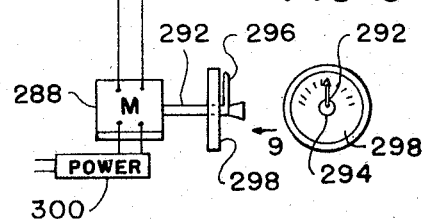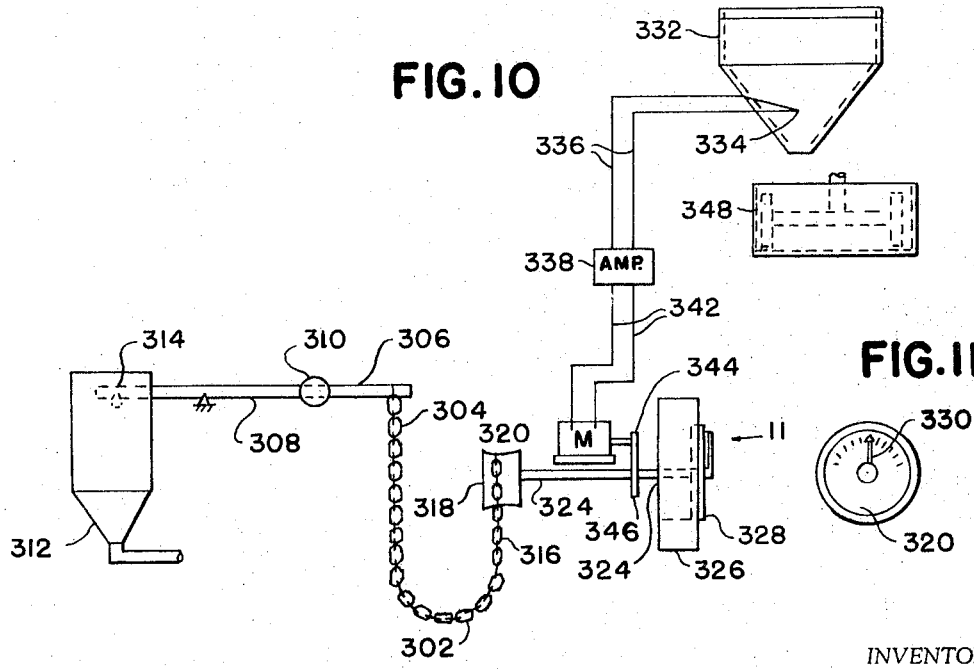

United States Patent Office 3,353,407
Patented Nov. 21, 1967

3,353,407
GRANULAR MATERIAL TESTING APPARATUS
Harry W. Dietert, Kerrville, Tex., and Ralph E. Steinmueller, Detroit, Mich., assignors to Harry W. Dietert Co., Detroit, Mich., a corporation of Michigan
Filed Aug. 24, 1964, Ser. No. 391,420
4 Claims. (Cl. 73—101)

This application is a continuation-in-part of copending patent application, Ser. No. 259,069, filed Feb. 18, 1963, now Patent No. 3,168,926.

The invention relates to the conditioning of granular material and refers more specifically to physical properties testing apparatus for use in granular material conditioning apparatus including structure for automatically weighing a predetermined amount of additive to be added to granular material and means for compensating the weighing structure in response to the physical properties of the granular material tested and for the temperature and composition of the granular material.

In the past, granular material for foundry operation has been conditioned by removing separate samples therefrom, testing them to determine the physical properties thereof and adding additives in a computed amount to the granular material to produce granular material having desired physical properties. Such operation is not sufficient for present day foundry operations in which speed of testing and conditioning granular material is essential.

In addition, with present fast molding cycles, it has been found desirable to compensate weighing structure of granular material conditioning apparatus in accordance with granular material temperature and composition, since desired ultimate condition of the granular material placed in a mixer with a fixed quantity of additive added thereto is dependent upon both temperature and composition of the granular material.

It is, therefore, an object of the present invention to provide improved granular material conditioning apparatus.

Another object is to provide granular material conditioning apparatus including improved physical properties testing apparatus.

Another object is to provide granular material conditioning apparatus including automatic weighing structure and means for compensating the weighing structure in accordance with the temperature of granular material fed thereto.

Another object is to provide granular material conditioning apparatus including automatic weighing structure and means for compensating the weighing structure in accordance with the composition of the granular material fed thereto.

Another object is to provide improved physical properties testing apparatus for granular material such as foundry sand including means for forming a test specimen of the granular material, means for testing the test specimen to destruction and means for providing an indication of the ultimate strength of the test specimen.

Another object is to provide structure as set forth above wherein the specimen is tested in compression.

Another object is to provide structure as set forth above wherein the specimen is tested in shear.

Another object is to provide temperature compensating means for weighing structure for use in granular material conditioning apparatus or the like.

Another object is to provide composition compensating apparatus for weighing structure for use in granular material conditioning apparatus or the like.

Another object is to provide granular material conditioning apparatus, physical properties testing and compensating apparatus which is simple, economical and efficient.

Other objects and features of the invention will become apparent as the description proceeds, especially when taken in conjunction with the accompanying drawings, illustrating a preferred embodiment of the invention, wheren:

FIGURES 2–4 are diagrammatic illustrations of physical properties testing apparatus for use in the granular material conditioning apparatus illustrated in FIGURE 1 shown in different positions in a cycle of granular material testing.

FIGURE 7 is a diagrammatic illustration of another modification of the physical properties testing apparatus illustrated in FIGURES 2–4 and including means for compensating the weighing structure of the granular material conditioning apparatus of FIGURE 1 in accordance with the physical properties of the granular material tested.

FIGURE 8 is a diagrammatic illustration of apparatus for compensating the weighing structure of the granular material conditioning apparatus illustrated in FIGURE 1 for the composition of granular material to be conditioned therein.

FIGURE 9 is a side elevation view of a portion of the composition compensating apparatus illustrated in FIGURE 8 taken in the direction of arrow 9 in FIGURE 8.

FIGURE 10 is a diagrammatic illustration of apparatus for compensating the weighing structure of the granular material conditioning apparatus illustrated in FIGURE 1 for the temperature of granular material to be conditioned therein.

FIGURE 11 is a side elevation view of a portion of the temperature compensating apparatus illustrated in FIGURE 10 taken in the direction of arrow 11 in FIGURE 10.

FIGURE 12 is a diagrammatic illustration of timing and actuating means for use with the physical properties testing apparatus illustrated in FIGURES 2 through 6.

Figures 1, 5, 6:
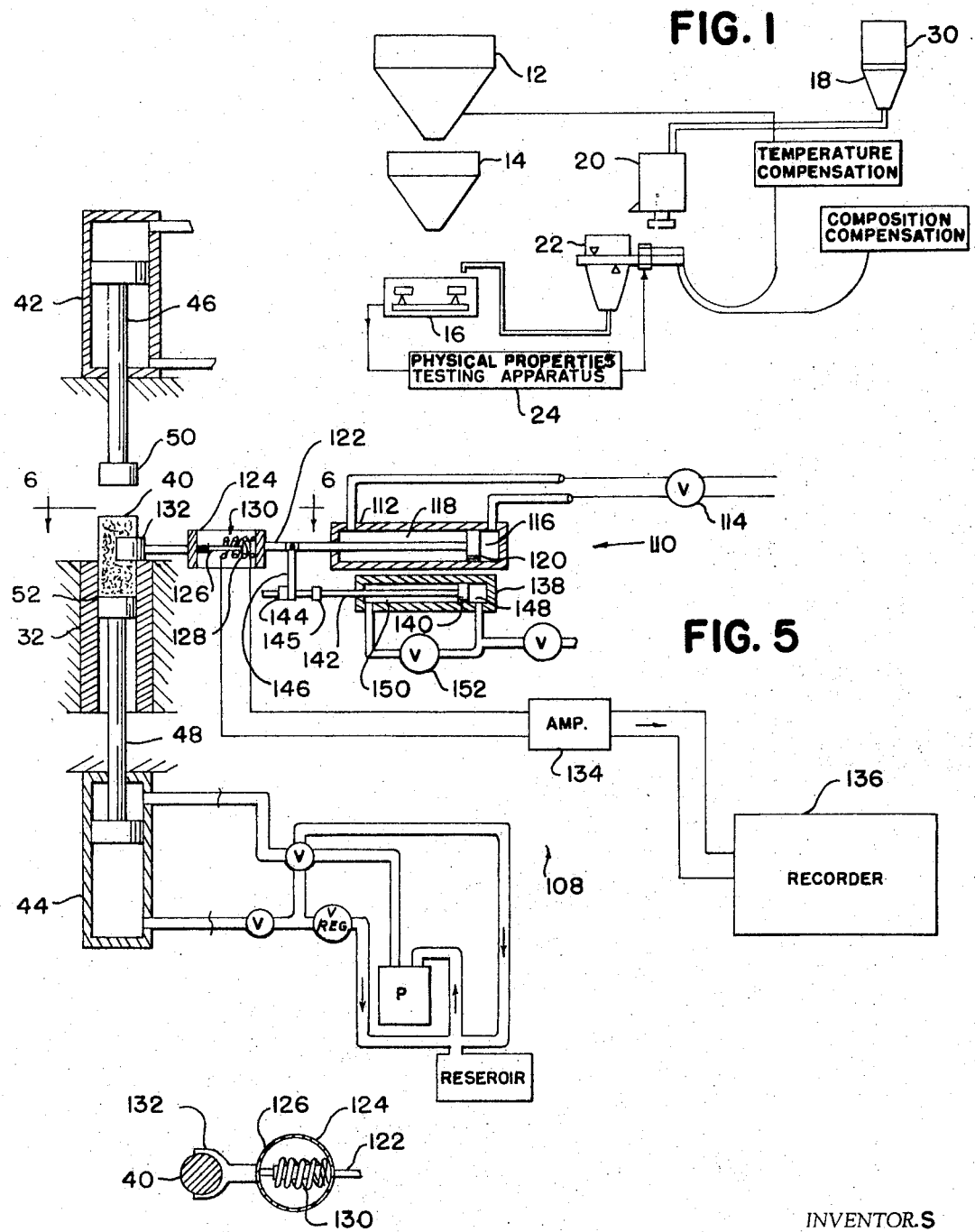
FIGURE 1 is a diagrammatic illustration of granular material conditioning apparatus including physical properties testing apparatus and weighing structure compensating apparatus, constructed in accordance with the invention.
FIGURE 5 is a modification of the granular material testing apparatus illustrated in FIGURES 2–4 for providing a shear test of a test specimen instead of a compressive test.
FIGURE 6 is a partial section view of a portion of the physical properties testing apparatus illustrated in FIGURE 5 taken substantially on the line 6—6 in FIGURE 5.

With particular reference to the figures of the drawings, one embodiment of the present invention will now be considered in detail.

The granular material conditioning apparatus 10, illustrated in FIGURE 1, comprises the storage bin 12 for granular material to be conditioned, a batch hopper 14 for receiving granular material from the granular material storage bin 12 in measured amounts and emptying the measured amounts of granular material into the granular material mixer 16. Additive, such as bonding agent, removed from sacks by sack opening structure 18 is fed from tank 20 in which it is stored to the weighing structure 22 for passage to the mixer 16 in measured quantities to provide granular material having predetermined physical properties in the mixer 16.

In operation a sample of granular material from the mixer 16 in one cycle of operation of the granular material conditioning apparatus 10 is tested by the physical properties testing apparatus 24 to produce a signal from the physical properties testing apparatus 24 which is utilized to determine the weight of additive added to the mixer in a subsequent cycle of operation by the balance structure 22. The weighing structure 22 is further compensated for the effect and composition of temperature of the granular material in the storage bin 12 by the temperature compensating apparatus 28 and the composition compensating apparatus 30 to provide the quantity of additive to the mixer 16 required to produce conditioned granular material of predetermined physical properties from the granular material in storage bin 12.

More specifically the physical properties testing apparatus 24 illustrated in FIGURES 2–4 includes the cylindrical sample container 32 positioned to receive a sample of granular material such as foundry sand from the mixer 16 through the chute 34, as shown best in FIGURE 2. The chute 34 is pivoted at 36 to swing away from the sample container 32 to permit compressing of granular material 38 in the sample container 32 into a test specimen 40, as shown in FIGURE 3.

The physical properties testing apparatus 24 further includes the opposed cylinders 42 and 44 which may be pneumatic and hydraulic, respectively, and the piston structures 46 and 48 reciprocally mounted in the cylinders 42 and 44, respectively, having the rams 50 and 52 on the ends thereof, as shown in FIGURES 2–4. Ram 50 carries the flag 54 thereon for a purpose which will become more evident later.

The hydraulic fluid reservoir 56 and pump 58 are connected to each other and to the opposite sides of the cylinder 44 through valves 60, 62 and 64, as shown best in FIGURE 4. Sources of high and low pressure air are connected to the cylinder 42 through high pressure air regulator 65, low pressure air regulator 67, valves 70, 72, 74, 76, 78 and 80 and the variable air pressure regulator 82 driven by motor 84. Chamber 86 in the upper end of the cylinder 42 is connected to a pressure diaphragm 88 supporting the core 90 of a low voltage differential transformer 92 through the valve 80.

The low voltage differential transformer 92 provides an output signal from the physical properties testing apparatus 24 to compensate the weighing structure 22 of the granular material conditioning apparatus 10 in accordance with the tested physical properties of one batch of granular material in mixer 16. The weighing structure 22 may thus be compensated to provide a subsequent batch of granular material in mixer 16, an amount of additive determined by the physical property of a previous batch of granular material.

In use of the physical properties testing apparatus 24 illustrated in FIGURES 2–4 the chute 34 is first swung into position about hinge 36 over the sample container 32. A sample of the granular material in the mixer 16 is deposited in the container 32. The chute 34 is then swung away from the container 32.

The plungers 48 and 50 are at this time in the lowered and raised position, respectively, as shown in FIGURE 2, due to actuation of the valves 60 and 62 to provide hydraulic fluid from pump 58 in the chamber 66 of cylinder 44 and exhaust the hydraulic fluid from the chamber 68 of cylinder 44 and to provide high air pressure from the high pressure air regulator 65 through open valves 72 and 74 to the chamber 94 of cylinder 42 and exhaust the air under pressure from chamber 86 through the open valve 76 and valve 74 through exhaust conduit 96. Valves 78 and 80 are closed at this time to prevent the high pressure from passing through variable air regulating valve 82 and into the diaphragm chamber 98.

After the sample has been deposited in the sample container 32, the plungers 50 and 52 are caused to compress the sample of granular material by movement toward each other to the position shown in FIGURE 3. Movement of the plunger 52 to the position thereof shown in FIGURE 3 requires reversing the pump connections to the cylinder 44 so that hydraulic fluid under pressure is pumped into the chamber 68 and out of the chamber 66 through valve 60 by pump 58. The pressure under which the granular material in the sample container is compressed is regulated and uniform. The hydraulic pressure in chamber 68 is held substantially the same as the high pneumatic pressure from the pressure regulator 65 in chamber 86, for example eighty pounds per square inch by the pressure regulator 64.

The high pressure from the pressure regulator 65 is provided in chamber 86 through valve 74 and valve 76. The pneumatic pressure in chamber 94 is exhausted through valve 74 and exhaust conduit 96 at this time. Valves 78 and 80 remain closed.

After compression of the test specimen 40 for a predetermined length of time at the predetermined pressure the valve 74 is actuated to provide air under pressure from regulator 65 in chamber 94 and to exhaust chamber 86. The hydraulic pressure in chamber 68 will thus move the test specimen 40 upward out of the sample container 32. The height to which the test specimen 40 raises above the sample container 32 may be determined by the physical dimensions of the cylinder 44 or if desired a photoelectric cell operable by flag means similar to flag 54 on ram 50 could be provided to indicate that the test specimen 40 is raised a predetermined distance above the sample container 32. When the test specimen is at the desired height the valve 62 is closed to lock the piston 48 in a predetermined position.

The valve 72 is then closed from the high pressure pneumatic source while the valve 70 to the low pressure pneumatic source is open. Valves 74 and 76 are then actuated to provide flow of the low pressure regulated air to pressure regulator 82. The variable pressure from pressure regulator 82 driven by motor 84 is then applied through the values 78 and 80 to the chamber 86 and the diaphragm chamber 98 while the chamber 94 of cylinder 42 is exhausted through valve 74 and conduit 96.

Thus the plunger 50 is moved down into contact with the test specimen 40 and compressive testing of the specimen 40 to destruction is accomplished as the pressure in the chamber 86 from the variable pressure regulator 82 increases. Similarly, the pressure on diaphragm 88 builds up with the pressure in chamber 86 so that when the test specimen 40 breaks due to the compression test thereof the core 90 of the low voltage differential transformer 92 is at a maximum position relative to the coil 100 of the transformer 92 to provide a maximum signal from the low voltage differential transformer 92 representative of the physical properties of the sample of granular material tested. The signal from the low voltage differential transformer 92 may be used to compensate weighing structure 22 as set forth in more detail in the above referenced copending patent application.

On destruction of the test specimen 40 the plunger 50 proceeds downward relatively rapidly until the flag 54 passes between the photo-sensitive cells 102 and the light source 104 of photoelectric means 106. Breaking the circuit formed by the photoelectric means 106 with flag 54 causes all of the valves in the physical properties testing apparatus illustrated in FIGURES 2–4 to return to their normal position to open valve 72, close valves 70, 78 and 80 and cause plungers 50 and 52 to be withdrawn from the sample container 32, at which time another sample of the granular material in the mixer 16 may be tested to determine its physical properties.

Actuating and timing means for the valves in the physical properties testing structure 24 have not been disclosed in detail as valve actuating means and means for producing sequential operation of the valves at selected time intervals in a cycle of operation are well known and could be provided by persons having ordinary skill in the art to which the invention pertains.

A modification 108 of the physical properties testing apparatus 24 is illustrated in FIGURES 5 and 6 wherein the same elements have been given the same reference numerals In the physical properties testing apparatus 108 illustrated in FIGURES 5 and 6 the sample container 32, cylinders 42 and 44, pistons 46 and 48, as well as plungers 50 and 52 are the same as in the physical properties testing apparatus 24. Again a test specimen 40 is produced in the sample container 32 and is pushed out of the container 32 a predetermined distance. However, in the physical properties testing apparatus 108 the test specimen 40 is not tested to destruction in compression by holding piston 48 in a fixed position while moving plunger 50 downward in contact with the test specimen 40.

In the physical properties testing apparatus 108 structure 110 is provided to produce a shear test of the test specimen 40. The shear test has been found to be a better indicator of the physical properties of conditioned granular material desired in foundry operations than the compressive test previously indicated.

The structure 110 comprises a cylinder 112 connected to valve 114 for alternately admitting fluid or air under pressure into one of chambers 116 and 118 and withdrawing fluid or air from the other to cause reciprocation of the piston 120 within the cylinder 112. Piston 120 is connected through piston rod 122 to the deformable ring 124 having connected to the opposite sides thereof on the inner periphery the core 126 and the coils 128 of a linear variable differential transformer 130. The deformable ring 124 is further connected to the arcuate sample contacting member 132, as shown best in FIGURE 6.

Thus in operation the piston 120 is first caused to assume a rightwardmost position, as illustrated in FIGURE 5, while the test specimen 40 is being formed and positioned. Subsequently, the piston 120 is caused to move to the left by actuation of the valve 114 to place the arcuate sample contacting member 132 in contact with the sample specimen 40 and the pressure is built up in chamber 116 to ultimately cause failure of the sample specimen 40 in shear.

During building up of pressure in chamber 116 the deformable ring 124 will produce relative movement between the core 126 and coils 128 of the linear variable differential transformer 130 which is representative of the physical properties of the sample specimen 40. The signal from the linear variable differential transformer 130 is applied through an amplifier 134 to a recorder 136. If desired the signal from the linear voltage differential transformer may be applied in the same manner as the signal from the linear voltage differential transformer 92 of the physical properties testing apparatus of FIGURES 2-4 to provide desired compensation for weighing structure 22, as previously indicated.

To speed up the operation of the physical properties testing apparatus 108 a second cylinder 138 having a reciprocal piston 140 mounted therein with a piston rod 142 having spaced apart abutments 144 and 145 thereon is provided in conjunction with the rigid abutment 146 on piston rod 122. Chambers 148 and 150 formed in cylinder 138 by piston 140 are connected through bleed valve 152 to permit rapid return of the piston 140 to the right while retarding the movement of the piston 140 to the left, as shown in FIGURE 5.

Thus in operation the piston rod 122 moves from its rightwardmost position in FIGURE 5 to the left. The initial speed thereof is relatively rapid since the abutment 146 does not contact either of the abutments 144 or 145 on piston rod 142. As the test specimen 40 is approached the abutment 146 contacts the abutment 144 whereby the speed of the movement of piston 120 to the left is reduced due to the bleed valve 152 restricting movement of the piston 140. On the return stroke of the piston 120 even though the fixed abutment 146 contacts the abutment 145, the speed of movement of the piston rod 120 is not reduced since valve 152 allows rapid flow of fluid from chamber 148 to chamber 150 of cylinder 138.

Another modification 160 of the physical properties testing apparatus 24 is illustrated in FIGURE 7. In the apparatus 160 the linear variable differential transformer has been eliminated and means 162 are provided for controlling the amount of bonding agent weighed by weighing structure 22 in accordance with the physical properties of granular material tested by apparatus 160 which is primarily mechanical rather than electrical.

In the physical properties testing apparatus 160 a pair of pneumatic cylinders 164 and 166 are provided having rams 168 and 170 respectively reciprocally mounted on pistons 169 and 171 therein for movement in relation to a sample container 172 in a manner previously described in conjunction with the rams 48 and 50 and sample container 32 of the physical properties testing apparatus 24 illustrated in FIGURES 2-4. Apparatus similar to chute 34 for loading a sample of granular material in the sample container 172 may be used in conjunction with the physical properties testing apparatus 160.

The pneumatic apparatus 174 and 176 and the apparatus 162 for adjusting the weight of the bonding agent weighed in accordance with a tested physical property of a sample of granular material will be considered in detail in conjunction with a cycle of operation of apparatus 160.

During feeding of a sample of granular material into the sample container 172, the four-way solenoid actuated valve 178 is energized to feed air into end 180 of cylinder 166 and to exhaust air from end 182 of cylinder 166. Similarly, the four-way valve 184 is energized to provide air under substantial pressure from high pressure regulator 186 in the end 188 of cylinder 164 and at the same time to exhaust air from the end 190 of cylinder 164 through the open solenoid valve 192, valve 184 and exhaust conduit 194. At this time the solenoid actuated valve 196 will be closed. The rams 168 and 170 will thus be at an upper and lower limit respectively.

After the sample of granular material has been positioned in the container 172 the valve 178 is actuated to feed air under pressure into end 182 of cylinder 166 and to exhaust the air from the end 180 thereof to raise the ram 170 under a regulated pressure of, for example, eighty pounds per square inch, from pressure regulator 186 through conduit 198. At the same time the valve 184 is actuated to reverse the connection of the ends 188 and 190 of the cylinder 164 to the exhaust conduit 194 and pressure regulator 186 to produce a downward movement of the ram 168 under the relatively high pressure. The sample of granular material in the container 172 is thus compressed as before for a predetermined time at a regulated pressure to provide a test specimen.

The valve 184 is then actuated to raise the ram 168 as before whereby the ram 170 moves the compressed specimen a predetermined distance out of the sample container 172. The exact distance the test specimen moves out of the container is important and can be maintained by a photoelectric cell circuit as indicated in conjunction with the physical property testing apparatus 24 or may be maintained as a result of the physical dimensions of the cylinder 166, the granular material sample and the length of time of compression of the sample at the determined high pressure.

Valve 192 is closed, the valve 184 is caused to open the end 188 of the cylinder 164 to the exhaust conduit 194 through valve 184 and the valve 196 is opened whereby air at a gradually increasing relatively low pressure from the pressure regulator 200 as controlled by the motor 204 and valve 206 connected by the screw adjustment 208 is admitted into end 190 of cylinder 164 and into conduit 210. Thus, as the pressure builds up in end 190 of cylinder 164 to the breaking point of the test cylinder extending out of the container 172 pressure similarly gradually builds up in conduit 210 whereby the piston 212 in cylinder 214 and the piston rod 216 to which it is rigidly secured are moved upward in FIGURE 12 against the bias of the spring 218 applied thereto.

Upward movement of the rod 216 carries with it the collar 220 which is rigidly secured thereto and consequently moves upward in FIGURE 7 the member 222 which is slidable on the shaft 252. Member 222 has attached thereto the end 226 of the chain 228. The end 230 of chain 228 is secured to the end 232 of balance beam 234. Thus as the pressure increases in conduit 210, the weight of the chain 228 which is carried by the end 232 of beam 234 is decreased.

When the test specimen 172 breaks, the pressure in the conduit 210 is suddenly lowered so that the rod 216 drops abruptly to pivot the lever 236 clockwise about its pivot mounting 238 due to engagement of the friction shoe 240 under bias of the spring 242 with the rod 216. Clockwise movement of the lever 236 activates the micro-switch 244 to break the electric circuit through the switch 244 to the solenoid 246 of the solenoid latch 248.

On breaking of the electric circuit by the switch 244, the solenoid 246 is deenergized and the spring biased armature 250 of latch 248 is urged into engagement with the shaft 252. Thus the member 222 is at this time locked in engagement with the shaft 252. Thus the member 222 will assume a position on shaft 216 during the testing of a test cylinder which it will maintain on breaking of the test cylinder.

Bonding agent is then weighed into the weighing tank 254 as before in accordance with the weight of the chain 228 supported by the end 232 of the balance beam 234. Subsequently, during another cycle of operation of the physical properties testing apparatus 160, as the pressure starts to rise in the conduit 210 and the rod 216 is moved upward the friction shoe 240 will cause pivoting of the lever 236 in a counterclockwise direction to again close the circuit through the micro-switch 244 and release the member 222 from the shaft 252 whereby the member 222 moves down shaft 252 to engage the collar 222 on rod 216 ready for a second cycle of operation.

Proper timing and actuating means for the various valves and regulators in the physical properties testing apparatus 24 and 160 have been assumed in the explanation of the operation thereof. It will be understood that the actuating and timing circuits would be easily produced by the usual mechanic in the art and could quite possibly take the form shown in FIGURE 12 of a shaft 256 driven by a motor 258 having located thereon a plurality of cams 260 for closing and opening switches 262 as required during rotation of motor 258. The various solenoid operated valves and circuits would then be connected to the leads 264 of the switches 262 to be energized as required. Since such energized actuating and timing structures are well known in the art, the exact details thereof are not set forth herein.

Apparatus is also provided as illustrated in FIGURES 8 and 9 for compensating the material weighing and transfer apparatus of the invention to take into account different granular material mixes or types of granular material.

Thus, in FIGURE 8 a chain 266 is provided having one end 268 connected to the end 270 of the balance beam 272 to aid the weight 274 in balancing granular material placed in the tank 276 mounted on the end 278 of the balance beam 272. The other end 280 of chain 266 is secured to a drum 282 which is rotatably mounted on a shaft 284 driven by a servo-motor 286. A second servo-motor 288 is positioned in a remote location adjacent an operator's position for the weighing and transfer apparatus and is connected to the servo-motor 286 by conductors 290.

The shaft 292 of servo-motor 288 is angularly positionable by means of a control knob 294 having indicator 296 thereon so that the angular position of shaft 292 may be set to indicate different granular materials or mixes thereof indicated on dial 298. Servo-motors 288 and 286 may be energized by convenient means such as power supply 300.

Thus, in operation after a particular granular material mix has been selected, the operator at a location remote from the balance beam 272 will rotate the indicator 292 to the selected granular material mix on dial 298 thus angularly positioning the shaft 292 of servo-motor 288. The servo-motor 286 will thus be caused to angularly rotate the shaft 284 in accordance with the rotation of the shaft 292 to rotate drum 282 and vary the length of the portion of the chain 266 which is supported by the balance beam 272 so that the bonding agent weighed and transferred to the mixer is compensated for the granular material mix in the mixer.

The apparatus for compensating the weighing and transfer apparatus of the invention for the temperature of granular material mixed is illustrated in FIGURES 10 and 11 again includes a chain 302 secured at end 304 to end 306 of balance beam 308 to aid the weight 310 in balancing granular material positioned in the tank 312 on the end 314 of balance beam 308. End 316 of chain 302 is connected to the drum 318 which is rotatably mounted on end 320 of shaft 322. The other end 324 of shaft 322 is connected to a temperature indicator 326 having a temperature dial 328 and indicator 330 thereon.

Thus in operation temperature of granular material in granular material storage bin 332 is sensed by means of thermo-couple 334 to produce an electric signal proportional to the temperature on conductors 336 fed to amplifier 338 and then to servo-motor 340 over conductors 342. The shaft 324 is driven by servo-motor 340 through the pinion 344 and gear 346 so that the chain 302 is wound on drum 318 in accordance with the temperature of the granular material in the storage bin 332, which is approximately at the temperature of the granular material mix in the mixer 348, to vary the weight of the chain 302 carried by the balance beam 308 and, therefore, the weight of the bonding agent which is fed to the mixer 348 in accordance with the temperature of the granular material. The indicator 330 is similarly driven by the shaft 324 to indicate the sensed temperature on dial 328.

While one embodiment of the present invention and modifications thereof have been considered in detail, it will be understood that other embodiments and modifications thereof are contemplated. It is the intention to include all embodiments and modifications which are defined by the appended claims within the scope of the invention.

What we claim as our invention is:

1. Physical properties testing apparatus comprising a cylindrical sample container for receiving a sample of granular material to be tested, a pair of oppositely disposed plungers axially aligned with and movable into and out of the sample container for compressing the granular material into a test specimen, means for moving the plungers into and out of the sample container including a hydraulic piston and cylinder connected to one of the plungers and a pneumatic piston and cylinder connected to the other of the plungers, means for positioning the test specimen for destructive testing including means for moving the plunger connected to the pneumatic piston and cylinder out of the sample container, means for moving the plunger connected to the hydraulic piston and cylinder into the sample container to position the test specimen partially out of the sample container and means for retaining the plunger connected to the hydraulic piston and cylinder in a predetermined position in the sample container, means for testing the test specimen to destruction including a third piston and cylinder, a piston rod connected to the third piston in the third cylinder and an arcuate member connected to the piston rod for movement transversely of the test specimen constructed and arranged to engage the test specimen transversely thereof with the test specimen extending out of the sample container and means for reducing the speed at which the piston rod is allowed to travel toward the test specimen after a predetermined travel thereof toward the test specimen and operable to allow rapid movement of the piston rod away from the test specimen including a fourth piston and cylinder parallel to the third piston and cylinder, a second piston rod having a pair of abutments thereon connected to the third piston, an abutment engaging member on the first mentioned piston rod movable between the abutments on the second piston rod and a bleeder valve connected between the ends of the fourth piston and cylinder, and means for providing a signal representative of the strength of the test specimen responsive to the means for testing the test specimen.

2. Physical properties testing apparatus comprising a cylindrical sample container for receiving a sample of granular material to be tested, a pair of oppositely disposed plungers axially aligned with and movable into and out of the sample container for compressing the granular material into a test specimen, means for moving the plungers into and out of the sample container, means for positioning the test specimen for destructive testing, means for testing the test specimen to destruction including a third piston and cylinder, a piston rod connected to the third piston in the third cylinder and an arcuate member connected to the piston rod for movement transversely of the test specimen constructed and arranged to engage the test specimen transversely thereof with the test specimen extending out of the sample container and means for reducing the speed at which the piston rod is allowed to travel toward the test specimen after a predetermined travel thereof toward the test specimen and operable to allow rapid movement of the piston rod away from the test specimen including a fourth piston and cylinder parallel to the third piston and cylinder, a second piston rod having a pair of abutments thereon connected to the third piston, an abutment engaging member on the first mentioned piston rod movable between the abutments on the second piston rod and a bleeder valve connected between the ends of the fourth piston and cylinder, and means for providing a signal representative of the strength of the test specimen responsive to the means for testing the test specimen.

3. Structure as set forth in claim 2 wherein the means for moving the plungers to compress the sample of granular material includes a hydraulic piston and cylinder connected to one of the plungers and a pneumatic piston and cylinder connected to the other of the plungers.

4. Structure as set forth in claim 2 wherein the means for providing a signal representative of the strength of the test specimen comprises a force ring connected in the piston rod connected to the third piston, a coil core and a coil connected to diametrically opposite points on the force ring, extending radially inwardly of the force ring toward each other and extending longitudinally of the piston rod connected to the third piston whereby the relative position thereof is changed on axial compressive forces produced in the piston rod and means for recording a signal in the coil resulting from a change in position of the coil relative to the core.

References Cited

UNITED STATES PATENTS

| | | | |
|---|---|---|---|
| 1,258,009 | 3/1918 | Jacobs | 177—192 |
| 2,791,120 | 5/1957 | Dietert et al. | 73—94 |
| 2,803,131 | 8/1957 | Schnadt | 73—101 |
| 2,810,289 | 10/1957 | Button | 73—94 |
| 2,859,028 | 11/1958 | Ruefenacht | 177—192 |
| 3,104,727 | 9/1963 | Chilton | 177—70 |
| 3,127,765 | 4/1964 | O'Neil | 73—94 |
| 3,173,505 | 3/1965 | Thorsson et al. | 177—70 |
| 3,248,926 | 3/1966 | Szatmari et al. | 73—15.4 |

RICHARD C. QUEISSER, *Primary Examiner.*

L. SMILOW, ROBERT EVANS, *Examiners.*

J. J. SMITH, J. WILLIAMSON, *Assistant Examiners.*